United States Patent
Uemura et al.

(10) Patent No.: US 9,408,151 B2
(45) Date of Patent: Aug. 2, 2016

(54) TERMINAL APPARATUS, BASE STATION APPARATUS, COMMUNICATION SYSTEM, CONTROL METHOD, AND INTEGRATED CIRCUIT

(71) Applicant: Sharp Kabushiki Kaisha, Osaka-shi, Osaka (JP)

(72) Inventors: Katsunari Uemura, Osaka (JP); Hidekazu Tsuboi, Osaka (JP); Yasuyuki Kato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 21 days.

(21) Appl. No.: 14/383,990

(22) PCT Filed: Mar. 11, 2013

(86) PCT No.: PCT/JP2013/056581
§ 371 (c)(1),
(2) Date: Sep. 9, 2014

(87) PCT Pub. No.: WO2013/137165
PCT Pub. Date: Sep. 19, 2013

(65) Prior Publication Data
US 2015/0036574 A1  Feb. 5, 2015

(30) Foreign Application Priority Data
Mar. 16, 2012  (JP) .................. 2012-059515

(51) Int. Cl.
*G08C 17/00* (2006.01)
*H04W 52/02* (2009.01)
*H04W 72/04* (2009.01)
*H04W 8/24* (2009.01)

(52) U.S. Cl.
CPC ...... *H04W 52/0251* (2013.01); *H04W 52/0216* (2013.01); *H04W 52/0229* (2013.01); *H04W 72/042* (2013.01); *H04W 8/24* (2013.01); *Y02B 60/50* (2013.01)

(58) Field of Classification Search
None
See application file for complete search history.

(56) References Cited

U.S. PATENT DOCUMENTS

2004/0127221 A1* 7/2004 Takano ................. H04W 88/08 455/445
2009/0180414 A1* 7/2009 Maeda ................. H04B 7/2643 370/311

(Continued)

OTHER PUBLICATIONS

Official Communication issued in International Patent Application No. PCT/JP2013/056581, mailed on May 14, 2013.

(Continued)

*Primary Examiner* — Anh-Vu Ly
(74) *Attorney, Agent, or Firm* — Keating & Bennett, LLP (57) ABSTRACT

The present invention provides techniques related to a terminal apparatus, base station apparatus, communication system, control method, and integrated circuit for performing efficient transmission and reception control between a mobile station apparatus and a base station apparatus to thereby reduce power consumption and improve radio resource utilization. The terminal apparatus sends capability information indicating whether notification of a state relating to power consumption of the terminal apparatus is possible or not to the base station apparatus, and upon receiving a parameter indicating start of determination on the state relating to the power consumption of the terminal apparatus from the base station apparatus, determines the state relating to power consumption based on the current communication state configurations of the terminal apparatus and sends state information representing the result of the determination on the state relating to power consumption to the base station apparatus.

9 Claims, 6 Drawing Sheets (56) References Cited

U.S. PATENT DOCUMENTS

| | | | |
|---|---|---|---|
| 2011/0070900 A1* | 3/2011 | Shi | H04W 68/00 |
| | | | 455/458 |
| 2011/0312328 A1* | 12/2011 | Choi | H04L 5/0062 |
| | | | 455/450 |
| 2013/0201955 A1* | 8/2013 | Vujcic | H04L 5/001 |
| | | | 370/329 |
| 2015/0079991 A1* | 3/2015 | Koskinen | H04W 36/0083 |
| | | | 455/436 |

OTHER PUBLICATIONS

3GPP TR 36.822, V0.2.0, "3rd Generation Partnership Project; Technical Specification Group Radio Access Network; LTE RAN Enhancements for Diverse Data Applications, (Release 11)," Nov. 2011, pp. 1-33.

* cited by examiner

| INDEX | DRX INTERVAL | PACKET SIZE TRANSMITTED IN ONE SUB-FRAME | RESOURCE BLOCK SIZE NECESSARY FOR ONE SUB-FRAME |
|---|---|---|---|
| 1 | 128 ms | 100 BYTES | 2 RB |
| 2 | 256 ms | 200 BYTES | 4 RB |
| ... | ... | ... | ... |

TERMINAL APPARATUS, BASE STATION APPARATUS, COMMUNICATION SYSTEM, CONTROL METHOD, AND INTEGRATED CIRCUIT

TECHNICAL FIELD

Embodiments of the present invention relate to techniques for a terminal apparatus, base station apparatus, communication system, control method, and integrated circuit for performing efficient transmission and reception control between a mobile station apparatus and a base station apparatus to thereby reduce power consumption and improve the efficiency of radio resource utilization.

Priority is claimed on Japanese Patent Application No. 2012-059515, filed Mar. 16, 2012, the content of which is incorporated herein by reference.

BACKGROUND ART

The 3rd Generation Partnership Project (3GPP), a standardization project, has standardized Evolved Universal Terrestrial Radio Access (hereinafter referred to as EUTRA) which achieves high speed communication by adoption of orthogonal frequency-division multiplexing (OFDM) communication technology and flexible scheduling performed in predefined frequency and time units called resource blocks.

The 3GPP is also discussing Advanced EUTRA, which can achieve still faster data transmission and has backward compatibility with EUTRA. For EUTRA and Advanced EUTRA, in addition to realizing high speed data communication, the problem of increased power consumption on mobile station apparatuses due to multiple applications always running on the mobile station apparatuses and improvement of radio resource utilization by these applications are also issues under discussion (NPL 1).

CITATION LIST

Non-Patent Document

NPL 1: 3GPP TR 36.822 V0.2.0 (2011-11) LTE RAN Enhancements for Diverse Data Applications, as found on the 3gpp.org website.

DISCLOSURE OF THE INVENTION

Problems to be Solved by the Invention

Generally, as a mechanism to reduce power consumption and improve the efficiency of radio resource utilization, control based on discontinuous reception (DRX) state, that is, intermittent reception, is widely known.

When considering a case where applications that generate only a small amount of data packets (for example, background communication (background traffic) or instant messaging communication) are always running on a mobile station apparatus as shown in NPL 1 however, it can be better in terms of reduction of power consumption and improvement of the efficiency of radio resource utilization to immediately finish communication upon completion of data packet transmission than to perform discontinuous reception. It is difficult however for the mobile station apparatus or the base station apparatus (and a higher-level network) to predict the total amount of data packets to be generated and/or patterns of their transmission and reception (such as transmission period, transmission interval, and the timing of packet generation).

In view of the problem outlined above, an object of embodiments of the present invention is to provide techniques relating to a terminal apparatus, base station apparatus, communication system, control method, and integrated circuit for performing efficient transmission and reception control between a mobile station apparatus and a base station apparatus to thereby reduce power consumption and improve the efficiency of radio resource utilization.

Means for Solving the Problems

The object of the invention has been attained by provision of the following. An embodiment of the invention is a terminal apparatus that communicates with a base station apparatus. The terminal apparatus sends capability information indicating whether notification of a state relating to power consumption of the terminal apparatus is possible or not to the base station apparatus, and upon receiving a parameter indicating start of determination on the state relating to the power consumption of the terminal apparatus from the base station apparatus, determines the state relating to power consumption based on current communication state configurations of the terminal apparatus, and sends state information representing a result of the determination on the state relating to power consumption to the base station apparatus.

Another embodiment of the invention is a base station apparatus that communicates with a terminal apparatus. The base station apparatus receives capability information indicating whether notification of a state relating to power consumption of the terminal apparatus is possible or not from the terminal apparatus, and sends a parameter indicating start of determination on the state relating to the power consumption of the terminal apparatus to the mobile station apparatus and thereby receives state information sent from the terminal apparatus representing a result of the determination on the state relating to power consumption made by the terminal apparatus based on current communication state configurations of the terminal apparatus.

Still another embodiment of the invention is a communication system including a base station apparatus and a terminal apparatus. The base station apparatus receives capability information indicating whether notification of a state relating to power consumption of the terminal apparatus is possible or not from the terminal apparatus, sends a parameter indicating start of determination on the state relating to the power consumption of the terminal apparatus to the mobile station apparatus so as to make the terminal apparatus start determination on the state relating to power consumption. The terminal apparatus sends capability information indicating whether notification of a state relating to power consumption of the terminal apparatus is possible or not to the base station apparatus, and upon receiving the parameter from the base station apparatus, determines the state relating to power consumption based on current communication state configurations of the terminal apparatus and sends state information representing a result of the determination on the state relating to power consumption to the base station apparatus.

Yet another embodiment of the invention is a control method for a terminal apparatus that communicates with a base station apparatus. The method includes the steps of: sending capability information indicating whether notification of a state relating to power consumption of the terminal apparatus is possible or not to the base station apparatus; receiving a parameter for use in determination of the state relating to the power consumption of the terminal apparatus from the base station apparatus; determining the state relating to power consumption based on current communication state configurations of the terminal apparatus; and sending state information representing a result of the determination on the state relating to power consumption to the base station apparatus.

Yet another embodiment of the invention is an integrated circuit for installation in a terminal apparatus that communicates with a base station apparatus. The integrated circuit causes the terminal apparatus to carry out a series of functions including: sending capability information indicating whether notification of a state relating to power consumption of the terminal apparatus is possible or not to the base station apparatus; receiving a parameter for use in determination of the state relating to the power consumption of the terminal apparatus from the base station apparatus; determining the state relating to power consumption based on current communication state configurations of the terminal apparatus; and sending state information representing a result of the determination on the state relating to power consumption to the base station apparatus.

While embodiments are disclosed herein in the context of techniques for a terminal apparatus, base station apparatus, communication system, control method, and integrated circuit for realizing efficient data transmission and reception control, communications schemes applicable in the embodiments are not limited to EUTRA or ones with backward compatibility with EUTRA, such as Advanced EUTRA.

For example, techniques discussed herein may be employed in various kinds of communication system, including a code division multiple access (CDMA) system, time division multiple access (TDMA) system, frequency division multiple access (FDMA) system, orthogonal FDMA (OFDMA) system, single carrier FDMA (SC-FDMA) system, and other systems. In the present specification, the terms "system" and "network" may be used interchangeably.

The mobile station apparatus and the base station apparatus may employ a technique to aggregate the frequencies (component carriers, or frequency bands) of multiple different frequency bands through carrier aggregation and handle them as a single frequency (frequency band). Component carriers include uplink component carriers corresponding to the uplink and downlink component carriers corresponding to the downlink.

For example, when five component carriers having a frequency bandwidth of 20 MHz are aggregated by carrier aggregation, a mobile station apparatus supporting carrier aggregation performs transmission and reception regarding them as a single frequency bandwidth of 100 MHz. Component carriers to be aggregated may either be contiguous frequencies or frequencies that are entirely or partially non-contiguous. For instance, when available frequency bands are 800 MHz, 2.4 GHz, and 3.4 GHz bands, one component carrier may be transmitted in the 800 MHz band, another in the 2.4 GHz band, and still another in the 3.4 GHz band.

It is also possible to aggregate contiguous or non-contiguous component carriers of the same frequency band. The frequency bandwidths of such component carriers may be narrower than the frequency bandwidth that can be received by the mobile station apparatus (20 MHz for example), or may be different from each other. The frequency bandwidths are preferably the same as any of the frequency bandwidths used in the existing cells for the sake of backward compatibility. The number of uplink component carriers assigned (configured, added) by the base station apparatus to the mobile station apparatus is preferably equal to or smaller than the number of the downlink component carriers.

Effects of the Invention

The embodiments of the invention can provide techniques relating to a terminal apparatus, base station apparatus, communication system, transmission/reception control method, and integrated circuit for performing efficient transmission and reception control between a mobile station apparatus and a base station apparatus to thereby reduce power consumption and improve the efficiency of radio resource utilization.

BEST MODE FOR CARRYING OUT THE INVENTION

Before describing the embodiments of the invention, techniques relevant to them are briefly introduced.

[Physical Channel]

Major physical channels (or physical signals) used in EUTRA and Advanced EUTRA are described. A channel means a medium used for signal transmission and a physical channel means a physical medium used for signal transmission. In EUTRA and Advanced EUTRA, physical channels could be added or their structure or format could be changed or added in future, but description of the embodiments of the present invention is not affected by any such change or addition.

In EUTRA and Advanced EUTRA, scheduling of physical channels is managed using radio frames. A radio frame represents 10 ms and a radio frame is composed of ten sub-frames. A sub-frame is further composed of two slots (that is, one slot=0.5 ms). A resource block is used as the smallest unit of scheduling for allocating physical channels. A resource block is defined by a certain frequency domain which includes a set of multiple sub-carriers (twelve sub-carriers for example) along the frequency axis and a domain represented by a certain transmission time interval (one slot).

Synchronization signals include three types of primary synchronization signal and secondary synchronization signals which are represented by 31 different codes interleaved in the frequency domain. Combinations of primary synchronization signals and secondary synchronization signals indicate 504 cell identifiers (physical cell IDs (physical cell identity; PCI)) identifying base station apparatuses and frame timing for radio synchronization. A mobile station apparatus identifies the cell ID present in synchronization signals received in cell search.

Physical broadcast information channel (physical broadcast channel (PBCH)) is transmitted for the purpose of indicating control parameters (broadcast information (system information)) used by mobile station apparatuses in a cell in common. For broadcast information not provided in the physical broadcast information channel, radio resources are indicated by the physical downlink control channel, and such broadcast information is transmitted in a Layer 3 message (system information) on the physical downlink shared channel. Broadcast information indicates a cell global identifier (CGI) representing a cell-specific identifier, a tracking area identifier (TAI) for managing a waiting area through paging, random access configuration information (such as transmission timing timer), common radio resource configuration information, and the like.

Downlink reference signals are classified into several types by their usage. For example, a cell-specific reference signal (RS) is a pilot signal transmitted at a predetermined power level in each cell and is a downlink reference signal regularly repeated in the frequency and time domains following certain rules. The mobile station apparatus measures the quality of reception of each cell by receiving the cell specific RS. The mobile station apparatus also uses the downlink cell specific RS as a reference signal for demodulating a physical downlink control channel transmitted simultaneously with the cell specific RS or the physical downlink shared channel. The cell specific RS uses a sequence that is identifiable on a per-cell basis.

The downlink reference signal is also used to estimate channel variations in the downlink. A downlink reference signal used for estimation of channel variations is called a channel state information reference signals (CSI-RS). A downlink reference signal configured individually for each mobile station apparatus is called UE specific reference signal (URS) or dedicated RS (DRS), and is used for demodulating the physical downlink control channel or the physical downlink shared channel.

Physical downlink control channel (PDCCH) is transmitted in the first several OFDM symbols (OFDM symbols 1 to 4 for example) from the start of each sub-frame, and is used for providing information on radio resource allocation to the mobile station apparatus in accordance with scheduling made by the base station apparatus or specifying an amount of adjustment for increasing or decreasing the transmission power. The mobile station apparatus has to monitor and receive the physical downlink control channel addressed to itself before sending or receiving downlink data or a Layer 3 message representing downlink control data (such as paging and handover commands) to obtain radio resource allocation information, which is called uplink grant in transmission and downlink grant (downlink assignment) in reception, from the physical downlink control channel. The physical downlink control channel may be configured to be transmitted in a dedicated resource block area specifically allocated to the mobile station apparatus by the base station apparatus instead of the OFDM symbols described above.

Physical uplink control channel (PUCCH) is used for providing an acknowledgement/negative acknowledgement (ACK/NACK) for data transmitted in the physical downlink shared channel, downlink channel (channel state) information (CSI), or making a scheduling request (SR), which is a request for uplink radio resource assignment (a radio resource request). CSI includes channel quality indicator (CQI), precoding matrix indicator (PMI), precoding type indicator (PTI), and rank indicator (RI). These indicators may be sometimes referred to as indications, but their usage and meaning are the same as indicators.

Physical downlink shared channel (PDSCH) is used for providing downlink data as well as broadcast information (system information) which is not provided by paging or the physical broadcast information channel to the mobile station apparatus as a Layer 3 message. Radio resource allocation information for the physical downlink shared channel is indicated on the physical downlink control channel. The physical downlink shared channel is allocated and transmitted in OFDM symbols other than the OFDM symbols in which the physical downlink control channel is transmitted. That is to say, the physical downlink shared channel and the physical downlink control channel are time-division multiplexed within a sub-frame.

Physical uplink shared channel (PUSCH) mainly transmits uplink data and uplink control data and can also include control data such as downlink reception quality or an ACK/NACK. In addition to uplink data, the physical uplink shared channel is also used for providing uplink control information to the base station apparatus as a Layer 3 message. As in the downlink, radio resource allocation information for the physical uplink shared channel is indicated in the physical downlink control channel.

Uplink reference signal (also called uplink pilot signal, uplink pilot channel) includes a demodulation reference signal (DMRS) which is used by the base station apparatus to demodulate the physical uplink control channel PUCCH and/or physical uplink shared channel PUSCH, and a sounding reference signal (SRS) used by the base station apparatus mainly for estimating the uplink channel state. The sounding reference signal includes a periodic sounding reference signal (periodic SRS) and aperiodic sounding reference signal (aperiodic SRS).

Physical random access channel (PRACH) is a channel used for providing a preamble sequence and has a guard time. A preamble sequence is designed so as to represent 6-bit information with 64 different sequences prepared. The physical random access channel is used as a way for the mobile station apparatus to access the base station apparatus. The mobile station apparatus uses the physical random access channel for requesting radio resources from the base station apparatus when the physical uplink control channel has not been configured or requesting transmission timing adjustment information (also called timing advance or TA) which is necessary for matching the timing of uplink transmission to the reception timing window of the base station apparatus.

Specifically, the mobile station apparatus uses radio resources for the physical random access channel configured by the base station apparatus to transmit a preamble sequence. Upon receiving transmission timing adjustment information, the mobile station apparatus sets a transmission timing timer for measuring the valid time of the transmission timing adjustment information which is configured by broadcast information as a common parameter (or individually configured by a Layer 3 message), and monitors the uplink state regarding it as a transmission timing adjusted state during the valid time of the transmission timing timer (during measurement) and a transmission timing unadjusted state (transmission timing non-adjusted state) outside the valid time (while the timer is not active). Layer 3 message is a control-plane message passed between the mobile station apparatus and the base station apparatus in the radio resource control (RRC) layer and used interchangeably with the terms "RRC signaling" and "RRC message". As the other physical channels are not relevant to the embodiments of the invention, detailed descriptions of them are omitted.

[Wireless Network]

The coverages of the frequencies controlled by a base station apparatus are regarded as cells. The areas (cells) covered by the frequencies may be different in size and shape, or different frequencies may cover different areas. The mobile station apparatus operates in a cell, and when wanting to move to another cell, it is transferred to a suitable cell through a cell reselection procedure when not in wireless connection (when not performing communication) and through a handover procedure during a wireless connection (while performing communication). A suitable cell generally refers to a cell for which access from mobile station apparatuses is not inhibited and which provides the best downlink reception quality.

Carrier aggregation, also called cell aggregation, is communication performed through multiple cells using multiple component carriers (frequency bands). The mobile station apparatus may also be wirelessly connected with the base station apparatus via a relay station apparatus (or a repeater) for each frequency. That is, the base station apparatus in the embodiments of the invention may be replaced with a relay station apparatus.

The third-generation base station apparatus defined by 3GPP is called NodeB, and the base station apparatus in EUTRA and Advanced EUTRA is called eNodeB. The third-generation mobile station apparatus defined by 3GPP is called user equipment (UE). The base station apparatus manages cells, which are areas in which mobile station apparatuses can perform communication. Cells are also represented as macro-cell, femto-cell, pico-cell, and nano-cell based on the size of the area in which communication with mobile station apparatuses is possible. When the mobile station apparatus is able to communicate with a certain base station apparatus, one of the cells serviced by the base station apparatus that is being used for communication with the mobile station apparatus is the serving cell and the other cells are called neighboring cells.

With the foregoing in mind, preferred embodiments of the invention will now be described in detail with reference to the accompanying drawings. Note that when specific description of well-known features or configurations relevant to the embodiments of the present invention is considered to obscure the gist of the embodiments in description thereof, detailed description of such a feature or configuration is omitted in the description of the embodiments of the invention.

<First Embodiment>

The first embodiment of the invention is described below. The first embodiment relates to a transmission/reception control method for a mobile station apparatus 1; in particular, a transmission/reception control method based on state determination performed during communication by the mobile station apparatus 1 will be shown.

Figure 1:
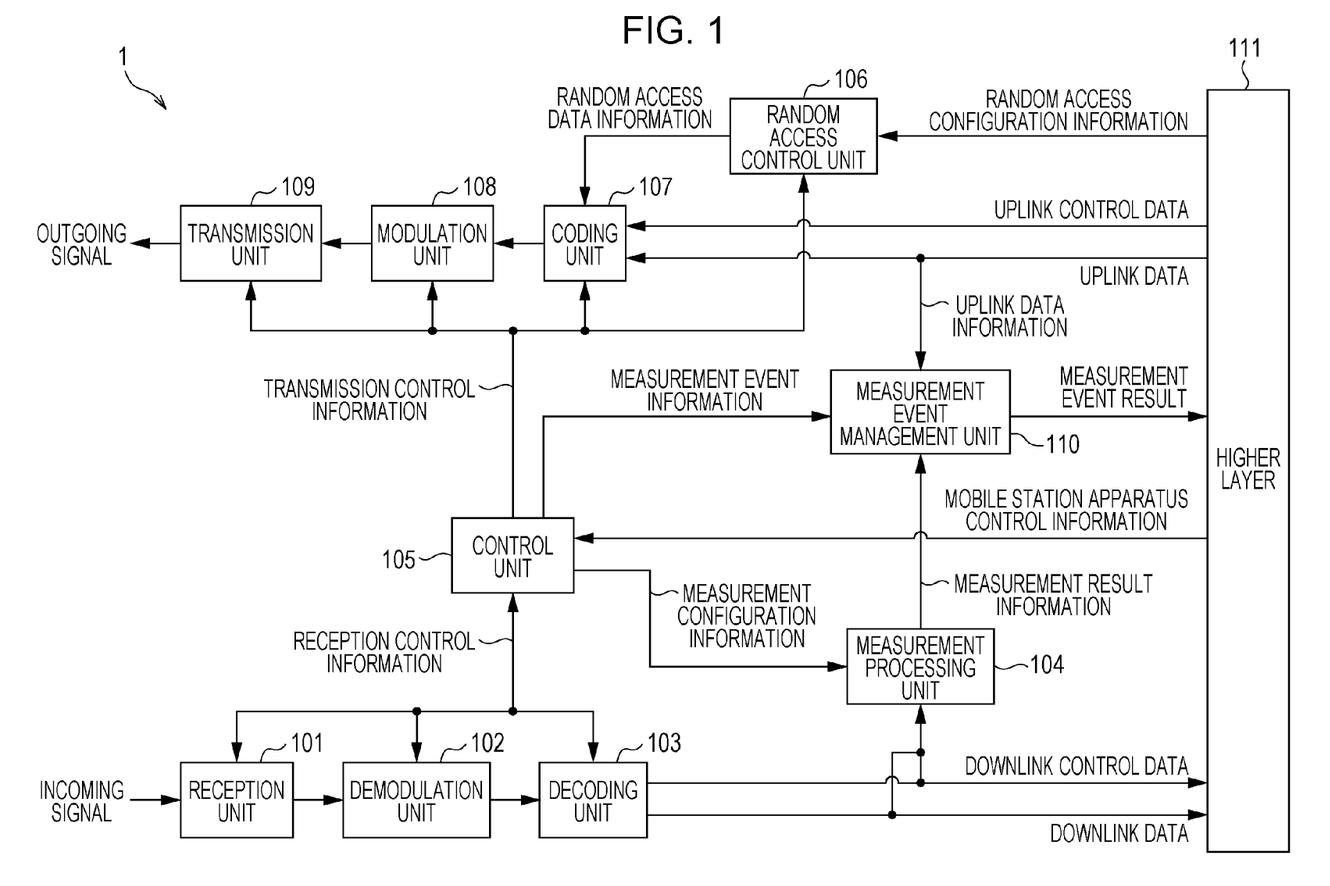
FIG. 1 is a block diagram generally showing the configuration of a mobile station apparatus in an embodiment of the invention.

FIG. 1 is a block diagram showing an example of the mobile station apparatus 1 according to the first embodiment of the invention. The mobile station apparatus 1 includes a reception unit 101, a demodulation unit 102, a decoding unit 103, a measurement processing unit 104, a control unit 105, a random access control unit 106, a coding unit 107, a modulation unit 108, a transmission unit 109, a measurement event management unit 110, and a higher layer 111. The higher layer 111 and measurement event management unit 110 are blocks that implement the specific functions of the radio resource control (RRC) layer responsible for radio resource control. The random access control unit 106 is a block to implement the specific functions of the medium access control (MAC) layer, which manages the data link layer.

The mobile station apparatus 1 may include multiple sets of reception-related blocks (reception unit 101, demodulation unit 102, decoding unit 103) and transmission-related blocks (coding unit 107, modulation unit 108, transmission unit 109) for supporting multiple frequencies (frequency bands, frequency bandwidths).

In relation to reception, mobile station apparatus control information is input to the control unit 105 from the higher layer 111 and reception control information which is control information relating to reception is appropriately input to the reception unit 101, demodulation unit 102, and decoding unit 103. The mobile station apparatus control information, including reception control information and transmission control information, is information necessary for controlling wireless communication of the mobile station apparatus 1. It is configured with wireless connection resource configurations individually sent from the base station apparatus 2, cell specific broadcast information, or system parameters, and input to the control unit 105 by the higher layer 111 when necessary. The reception control information includes information on the reception frequency band as well as reception timing for various channels, multiplexing schemes, radio resource allocation information, and so forth. The control unit 105 inputs measurement event information, used for measurement event decision of whether results of measurements at the mobile station apparatus 1 fulfill certain conditions, to the measurement event management unit 110. Measurement event information may include measurement events of different kinds. For measurement event information, measurement events that differ among cells or frequencies may be configured by the base station apparatus 2.

Incoming signals are received by the reception unit 101. The reception unit 101 receives signals at a frequency band specified by reception control information. The received signal is input to the demodulation unit 102. The demodulation unit 102 demodulates the received signal, and inputs the signal to the decoding unit 103, where the signal is correctly decoded into downlink data and downlink control data, and the decoded data are then input to the higher layer 111. The data are also input to the measurement processing unit 104.

The measurement processing unit 104 generates measurement result information based on measurements of reception quality (such as SIR, SINR, RSRP, RSRQ, RSSI, and path loss) of downlink reference signals for each cell (component carrier) and results of measurements of the reception error rate on the physical downlink control channel or physical downlink shared channel, and outputs the measurement result information to the measurement event management unit 110. The measurement event management unit 110 uses the measurement result information as a parameter for determining whether a configured measurement event is valid or not.

In relation to transmission, mobile station apparatus control information, which is a control parameter for controlling relevant blocks, is input from the higher layer 111 to the control unit 105, and transmission control information, which is control information relating to transmission, is appropriately input to the random access control unit 106, coding unit 107, modulation unit 108, and transmission unit 109. The transmission control information includes coding information, modulation information, transmission frequency band information, transmission timing relevant to various channels, multiplexing schemes, radio resource allocation information, and the like as uplink scheduling information for the outgoing signal.

Random access configuration information is input from the higher layer 111 to the random access control unit 106. The random access configuration information includes preamble information, radio resource information for transmission of the physical random access channel (such as a power adjustment parameter and the number of preamble retransmissions), and the like. The higher layer 111 manages transmission timing adjustment information and a transmission timing timer used for adjustment of uplink transmission timing and also manages the state of uplink transmission timing (transmission timing adjusted state or transmission timing unadjusted state) for each cell (or each cell group or each TA group). Transmission timing adjustment information and transmission timing timer are input from the higher layer 111 to the coding unit 107 as uplink control data.

If it is necessary to manage the state of multiple uplink transmission timings, the higher layer 111 manages transmission timing adjustment information corresponding to the uplink transmission timing for each cell (or cell group or TA group).

To the coding unit 107, the uplink data and uplink control data from the higher layer 111 as well as random access data information indicating parameters relating to transmission of the physical random access channel is input from the random access control unit 106. The coding unit 107 generates a preamble sequence to be sent on the physical random access channel based on the random access data information. The coding unit 107 also encodes data appropriately in accordance with transmission control information and outputs it to the modulation unit 108.

The modulation unit 108 modulates the output from the coding unit 107. The transmission unit 109 maps the output from the modulation unit 108 to the frequency domain and converts frequency domain signals into time domain signals, adds them onto a carrier wave of a prescribed frequency, and applies power amplification to them. The transmission unit 109 also adjusts uplink transmission timing in accordance with the transmission timing adjustment information for each cell (or each cell group or each TA group) input from the higher layer 111. The physical uplink shared channel, in which uplink control data is carried, may include a Layer 3 message (radio resource control or RRC message) for example, in addition to user data.

Upon generation of uplink data, uplink data information, which is information about the uplink data, is input to the measurement event management unit 110. The uplink data information indicates the capacity of the transmit buffer for uplink data, quality of service (QoS), the total amount of transmit data, and the like. The measurement event management unit 110 uses the uplink data information as a parameter for determining whether a configured measurement event is valid or not. If one or some of configured measurement events are valid (that is, fulfill configured measurement event conditions), the measurement event management unit 110 notifies the higher layer 111 of the measurement event result(s) representing the valid measurement event(s). If a measurement event that once was valid has come to no longer be valid (that is, no longer fulfills the defined measurement event conditions), the measurement event management unit 110 may notify the higher layer 111 of the measurement event result representing the details of such a measurement event.

While FIG. 1 omits the other components of the mobile station apparatus 1 as they are not closely relevant to this embodiment, it will be apparent that the mobile station apparatus 1 has multiple blocks having other functions necessary for operation as the mobile station apparatus 1 as its components.

Figure 2:
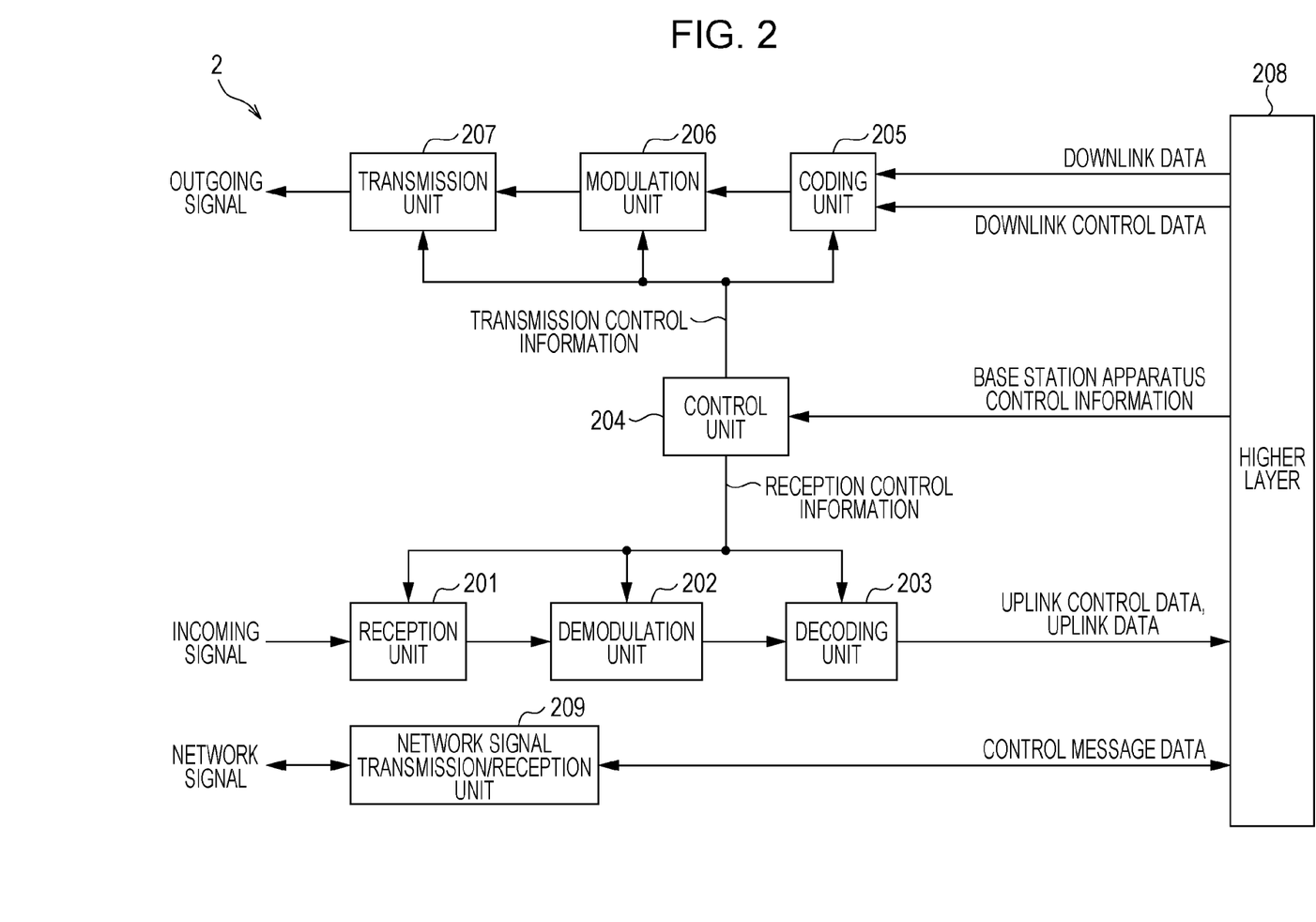
FIG. 2 is a block diagram generally showing the configuration of a base station apparatus in an embodiment of the invention.

FIG. 2 is a block diagram showing an example of the base station apparatus 2 in the first embodiment of the invention. The base station apparatus 2 includes a reception unit 201, a demodulation unit 202, a decoding unit 203, a control unit 204, a coding unit 205, a modulation unit 206, a transmission unit 207, a higher layer 208, and a network signal transmission/reception unit 209. The base station apparatus 2 may include multiple sets of reception-related blocks (reception unit 201, demodulation unit 202, decoding unit 203) and transmission-related blocks (coding unit 205, modulation unit 206, transmission unit 207) in order to support multiple frequencies (frequency bands, frequency bandwidths).

The higher layer 208 inputs downlink data and downlink control data to the coding unit 205. The coding unit 205 encodes the input data and inputs them to the modulation unit 206. The modulation unit 206 modulates the encoded signal. The signal output from the modulation unit 206 is input to the transmission unit 207. The transmission unit 207 maps the input signal to the frequency domain and then converts the frequency domain signal into a time domain signal, adds it onto a carrier wave of a prescribed frequency, applies power amplification to it, and sends the signal. The physical downlink shared channel in which downlink control data is carried typically takes the form of a Layer 3 message (an RRC message).

The reception unit 201 converts a signal received from the mobile station apparatus 1 to a baseband digital signal. When cells with different transmission timings are configured for the mobile station apparatus 1, the reception unit 201 receives signals at timings that differ among the cells (or cell groups or TA groups). The digital signal converted by the reception unit 201 is input to and demodulated by the demodulation unit 202. The signal demodulated by the demodulation unit 202 is then input to and decoded by the decoding unit 203, which outputs correctly decoded uplink control data and uplink data to the higher layer 208. Base station apparatus control information necessary for control of these blocks is information necessary for wireless communication control of the base station apparatus 2, including reception control information and transmission control information. It is configured by a higher network apparatus (such as an MME, gateway apparatus, or OAM) or system parameters and input to the control unit 204 by the higher layer 208 when necessary.

The control unit 204 appropriately inputs base station apparatus control information relating to transmission to the coding unit 205, modulation unit 206, and transmission unit 207 as transmission control information and base station apparatus control information relating to reception to the reception unit 201, demodulation unit 202, and decoding unit 203 as reception control information. RRC for the base station apparatus 2 exists as part of the higher layer 208.

The network signal transmission/reception unit 209 performs transmission (transfer) or reception of control messages or user data between base station apparatuses 2 or between a higher network apparatus and the base station apparatus 2. While FIG. 2 omits the other components of the base station apparatus 2 as they are not closely relevant to this embodiment, it will be apparent that the base station apparatus 2 has multiple blocks having other functions necessary for operation as the base station apparatus 2 as its components.

Figure 3:
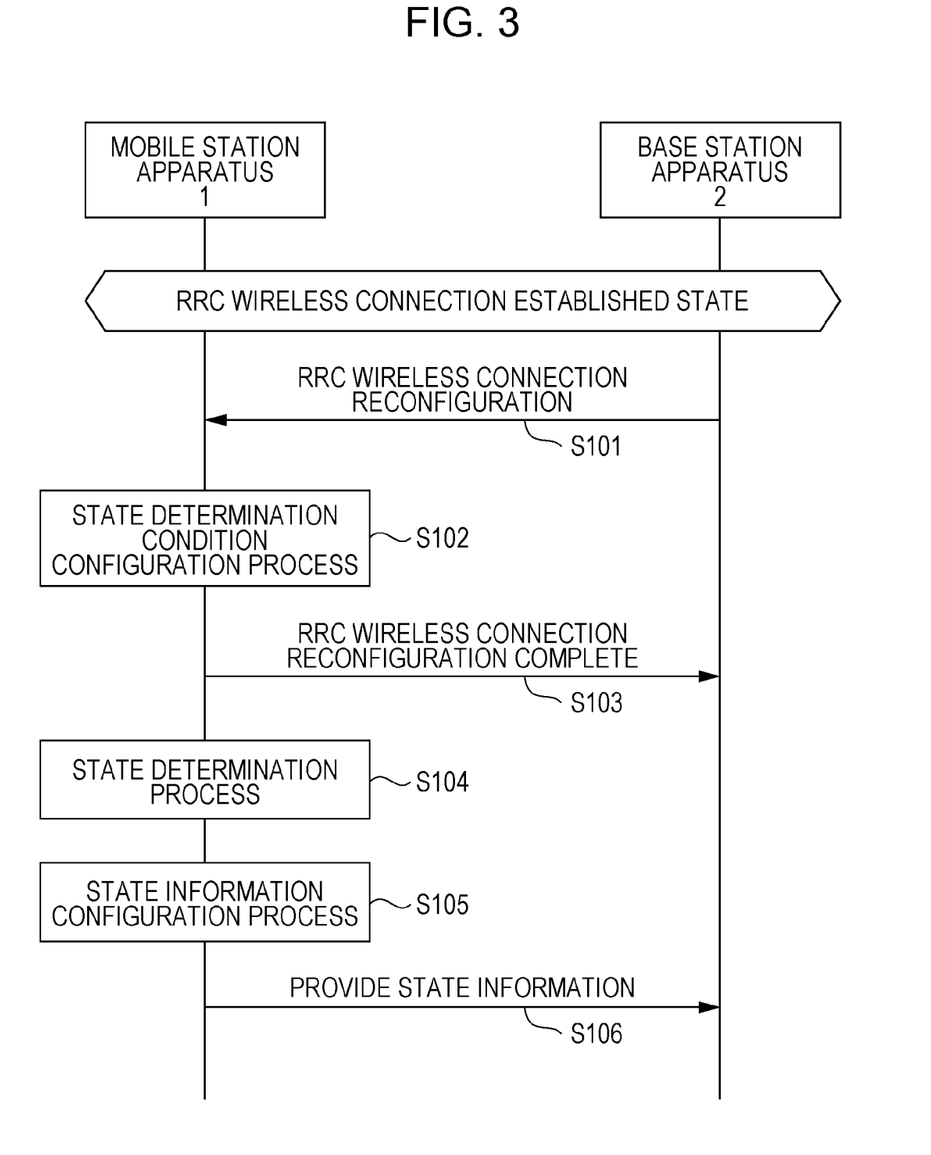
FIG. 3 is a sequence chart diagram illustrating an example of operations of the mobile station apparatus and the base station apparatus in a first embodiment of the invention.

FIG. 3 is a sequence chart diagram illustrating exchange of information relating to transmission/reception control between the mobile station apparatus 1 and the base station apparatus 2 in the first embodiment.

The mobile station apparatus 1 has received the physical broadcast information channel sent by the base station apparatus 2 and selected a suitable cell based on information from the physical broadcast information channel. A suitable cell generally means a cell which provides good reception quality and for which access from the mobile station apparatus is not restricted. The mobile station apparatus 1 camping in the suitable cell transitions to an RRC wireless connection established state (also called a connected state) when it needs to transmit certain data (user data for an application, control data relevant to a handover, or the like) to the base station apparatus 2 in response to generation of uplink transmit data. In order to shift the RRC state from an RRC wireless connection unestablished state (also called an idle state) to an RRC wireless connection established state, or a state in which communication is taking place, the mobile station apparatus 1 carries out a random access procedure.

The mobile station apparatus 1 and base station apparatus 2 in FIG. 3 start operation with a wireless connection established between them via at least one cell after execution of a random access procedure.

In the following description, the term "predetermined state" (a first communication state) means the state of transmission/reception (communication state, traffic state) of the mobile station apparatus 1 defined by one or more parameters, that is, configurations relating to uplink channel transmission control or downlink channel reception control specified by one or more parameters. Also, the term "current state" (a second communication state) in the following description means the current state of transmission and reception (communication state, traffic state) of the mobile station apparatus 1, that is, configurations relating to uplink channel transmission control or downlink channel reception control presently configured for the mobile station apparatus 1. Certain conditions established for the mobile station apparatus 1 are called state determination conditions.

The base station apparatus 2 sends an RRC wireless connection reconfiguration message to the mobile station apparatus 1 (step S101). The RRC wireless connection reconfiguration message is preferably sent as an RRC message (Layer 3 message). The base station apparatus 2 sets parameters necessary for the mobile station apparatus 1 to start monitoring its state and determine (decides, detects) whether it is in the predetermined state into the RRC wireless connection reconfiguration message and sends it to the mobile station apparatus 1. The base station apparatus 2 may determine if the mobile station apparatus 1 is able to determine the predetermined state or not from mobile station apparatus capability information provided in a mobile station apparatus capability message (UE Capability) sent from the mobile station apparatus 1 (not shown).

The parameters necessary for the mobile station apparatus 1 to determine (decide, detect) whether it is in the predetermined state may include the transmission interval of uplink data (or alternatively DRX interval), the number of sub-frames necessary for a single transmission/reception, a packet size transmitted in one sub-frame (bit size, protocol data unit size), and a resource block size necessary for one sub-frame, for example. Parameters to be configured are not limited to the parameters listed above but may be any parameter that prescribes the state of the mobile station apparatus 1. For example, some or all of information such as an average and/or maximum uplink buffer capacity, the number of retransmissions within a certain time period, an average and/or maximum uplink throughput, an average and/or maximum downlink throughput, an average and/or maximum amount of uplink packets (packet size), an average and/or maximum amount of downlink packets (packet size), an average and/or maximum transmission power may be configured. In a case where parameters are configured by the base station apparatus 2 so that more than one predetermined state are indicated, index information indicating a set of parameters may be additionally configured. The transmission interval of uplink data may be a threshold indicating the transmission time interval between an uplink data transmission from the mobile station apparatus 1 to the next uplink data transmission from the mobile station apparatus 1. The number of sub-frames necessary for a single transmission/reception may be a threshold indicating an upper limit on the number of sub-frames necessary for a single transmission/reception. The packet size transmitted in one sub-frame may be a threshold indicating an upper limit on the packet size transmitted in a sub-frame.

The base station apparatus 2 may set specific numerical values for the parameters or configure only parameters used for state determination. When only parameters used for state determination are configured, the mobile station apparatus 1 autonomously decides on the predetermined state. If parameters indicating the predetermined state are deleted from an RRC wireless connection reconfiguration message, the mobile station apparatus 1 stops monitoring of its state and determination on the predetermined state, and may also discard all the relevant information it has collected so far. Alternatively, if parameters indicating the predetermined state are deleted from an RRC wireless connection reconfiguration message, the mobile station apparatus 1 may maintain relevant information it has collected so far for a certain time period (one hour for example) and discard them all after elapse of the time period.

The base station apparatus 2 may configure parameters indicating the predetermined state for the mobile station apparatus 1 using broadcast information instead of an RRC wireless connection reconfiguration message. The base station apparatus 2 may use an RRC wireless connection reconfiguration message to update parameters indicating the predetermined state which was configured using broadcast information. When parameters are configured using broadcast information, determination of whether the mobile station apparatus 1 is in the predetermined state is automatically started by the mobile station apparatus 1 when the mobile station apparatus 1 has transitioned from an RRC wireless connection unestablished state (idle state) to an RRC wireless connection established state (connected state).

Figure 4:
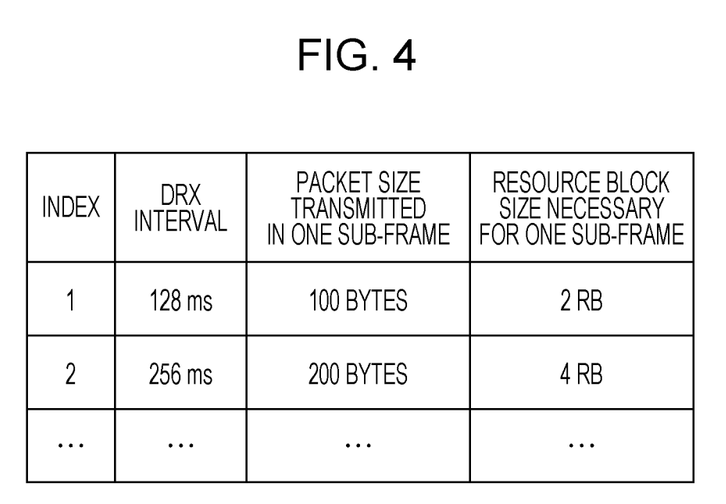
FIG. 4 shows an exemplary combination of parameters in the first embodiment of the invention.

Upon receiving the RRC wireless connection reconfiguration message from the base station apparatus 2, the mobile station apparatus 1 sets the parameters it received in a state determination condition configuration process (step S102). If the base station apparatus 2 sets specific numerical values for the parameters, the mobile station apparatus 1 can create a table such as shown in FIG. 4 from the parameters it received. FIG. 4 illustrates a case where the DRX interval, a packet size transmitted in a sub-frame, and a resource block size necessary for one sub-frame are specified for the mobile station apparatus 1 by the base station apparatus 2, although this combination of parameters is not limitative. In a case where the mobile station apparatus 1 keeps a table like the one in FIG. 4 based on broadcast information or system parameters, the base station apparatus 2 may send an RRC wireless connection reconfiguration message including only an index (index information) that indicates a set of parameters to be used. In the state determination condition configuration process, the mobile station apparatus 1 starts control so as to collect information (such as results of measurements) regarding the received parameters or parameters indicated by the index from blocks of the mobile station apparatus 1. Collection of relevant information on the mobile station apparatus 1 is carried out by the measurement event management unit 110.

After the parameter configuration at step S102 is complete, the mobile station apparatus 1 generates an RRC wireless connection reconfiguration complete message indicating the completion of the RRC wireless connection reconfiguration procedure and sends it to the base station apparatus 2 (step S103). At this point, the mobile station apparatus 1 may select parameters to be used for state determination from the parameters configured by the RRC wireless connection reconfiguration message and notify the base station apparatus 2 of the selected parameters by including information indicating them in the RRC wireless connection reconfiguration complete message.

The mobile station apparatus 1 next starts a state determination process (step S104). In the state determination process, the mobile station apparatus 1 determines whether its current state of transmission/reception is in the predetermined state or not. Specifically, it decides whether or not the current state of transmission/reception (communication state, traffic state) of the mobile station apparatus 1 is applicable to the transmission/reception state (communication state, traffic state) for the mobile station apparatus 1 indicated by the one or more parameters configured by the base station apparatus 2.

The term "being in the predetermined state" may be interpreted as the mobile station apparatus 1 actually having entered a transmission/reception state that fulfills the aforementioned combination of parameters, or as the mobile station apparatus 1 deciding that it is able to transition to the state of transmission/reception controlled by the combination of parameters described above although the combination of parameters received is not fulfilled by the actual uplink data transmission. Determination of whether the mobile station apparatus 1 is in the predetermined state or not on the mobile station apparatus 1 is carried out by the measurement event management unit 110.

Figure 5:
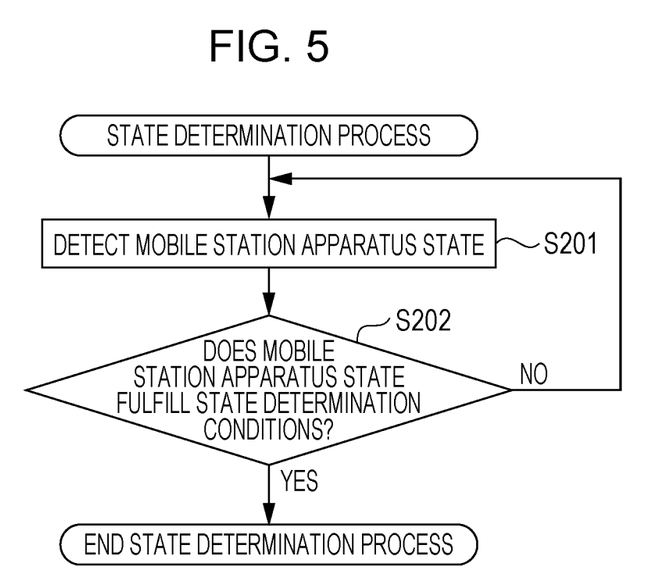
FIG. 5 shows an example of a state determination process performed at the mobile station apparatus in the first embodiment of the invention.

FIG. 5 is a flowchart diagram illustrating the state determination process (step S104) performed at the mobile station apparatus 1 in further detail. At step S201, the mobile station apparatus 1 performs detection of a mobile station apparatus state, which is a process to collect information on parameters indicating the predetermined state configured by the base station apparatus 2 and determine (decide, detect) the current state of the mobile station apparatus from the collected information. For example, when the base station apparatus 2 specifies the transmission interval (DRX interval) of uplink data as a parameter indicating the predetermined state, information on when data for transmission is generated is collected. When the base station apparatus 2 specifies the packet size transmitted in one sub-frame as a parameter indicating the predetermined state, information on the amounts of data transmitted in a sub-frame is collected. When the base station apparatus 2 specifies a resource block size necessary for one sub-frame as a parameter indicating the predetermined state, information on resource block sizes used for transmission is collected.

The mobile station apparatus 1 then estimates its current state by combining the pieces of information collected at step S201. Then, whether the estimated current state fulfills the predetermined state defined by the combination of parameters configured by the base station apparatus 2 or not is determined (step S202). If the current state of the mobile station apparatus 1 estimated at step S201 fulfills the predetermined state (state determination conditions) at step S202 (Yes at step S202), the state determination process ends and control is passed to the state information configuration process in FIG. 3 (step S105). If the current state of the mobile station apparatus 1 estimated at step S201 does not fulfill the predetermined state (state determination conditions) (No at step S202), control returns to the mobile station apparatus state detection step S201, where similar processing is repeated.

The predetermined state defined by a configured combination of parameters is preferably a state in which transmission/reception control suited for the communication state is configured in order to efficiently utilize radio resources on the mobile station apparatus 1 and the base station apparatus 2. In a case of communication in which a small amount of data packets such as background communication is transmitted at certain intervals, for example, transmission/reception control for efficiently utilize radio resources may be configuring transmission/reception control for the mobile station apparatus 1 so that transmission/reception takes place intermittently only in sub-frames at timings of data packet generation, rather than setting transmission/reception control so as to perform transmission and reception on each operation in contiguous sub-frames. Thus, by determining that the timing of data transmission/reception on the mobile station apparatus 1 or the amount of data transmitted or received at a time has fulfilled the predetermined state, the mobile station apparatus 1 can notify the base station apparatus 2 that it can support efficient transmission/reception control suited for the currently running applications or mode of communication (communication data type, traffic type).

By way of example, assume that the configured parameters are a DRX interval of 128 ms (milliseconds) and a packet size transmitted in one sub-frame of 100 bytes. In this scenario, if the interval between uplink data transmissions by the mobile station apparatus 1 is longer than 128 ms and the packet size transmitted in a sub-frame is smaller than 100 bytes, the mobile station apparatus 1 decides that the predetermined state is fulfilled. A timer for measuring how long the predetermined state is maintained may be implemented. If such a timer is additionally used in the aforementioned example, the mobile station apparatus 1 decides that the predetermined state is fulfilled when a state in which the interval between uplink data transmissions by the mobile station apparatus 1 is longer than 128 ms and the packet size transmitted in one sub-frame is smaller than 100 bytes has been maintained throughout the operation time of the timer. If the predetermined state comes to be no longer fulfilled before the timer expires, the mobile station apparatus 1 stops the timer. If the predetermined state is fulfilled once or several times while the timer is not operating (inactive), the mobile station apparatus 1 starts the timer.

If the state determination process (step S104) determines (decides, detects) that the mobile station apparatus 1 is in the predetermined state (that is, if it is determined that the state determination conditions are met in FIG. 5), the mobile station apparatus 1 proceeds to carry out a state information configuration process (step S105). The state information configuration process is a process to generate information for notifying the base station apparatus 2 that the transmission/reception state of the mobile station apparatus 1 is now in the state configured by parameters (the predetermined state).

The mobile station apparatus 1 generates one-bit information indicating the predetermined state in the state information configuration process. The mobile station apparatus 1 alternatively generates an index indicative of one of multiple configured predetermined states in the state information configuration process. Alternatively, the mobile station apparatus 1 sets multiple parameters required for indicating the predetermined state in the state information configuration process. Alternatively, the mobile station apparatus 1 sets an index indicative of one of multiple configured predetermined states and difference information in the state information configuration process. Alternatively, the mobile station apparatus 1 sets information indicating an optimized DRX interval (a DRX interval candidate) in the state information configuration process.

One-bit information indicating the predetermined state is appropriate when there is only one state for determination based on a parameter configured for the mobile station apparatus 1. An index indicative of one of multiple configured predetermined states is information appropriate when there are more than one state for determination based on parameters configured for the mobile station apparatus 1 (see FIG. 4). Multiple parameters necessary for indicating the predetermined state is information appropriate when the mobile station apparatus 1 autonomously determined the predetermined state. An index indicating one of multiple configured predetermined states and difference information are appropriate when there are multiple states for determination based on the parameters configured for the mobile station apparatus 1 and some of them are fulfilled. Information indicating the optimized DRX interval is appropriate when a parameter relevant to the DRX interval is configured for the mobile station apparatus 1 and there is a DRX interval suitable for the current state. Information indicating the optimized DRX interval may be a numerical value indicating the actual DRX interval, or an index (index information) in descending (or ascending) order with respect to the value specified by the base station apparatus 2, or one-bit information indicating a DRX interval longer (or shorter) than the current DRX interval.

The mobile station apparatus 1 sets the information (state information) it generated to a state information notification message and sends it to the base station apparatus 2 (step S106). The state information notification message is preferably sent using a Layer 3 or Layer 2 message, but it may be sent in a Layer 1 message. A Layer 2 message is a message interpreted with component tasks of Layer 2 and is a control command which is decoded in the physical layer (Layer 1) and then recognized in Layer 2. An L2 message in EUTRA and Advanced EUTRA is indicated with a control command interpreted in the MAC layer (MAC Control Element, MAC control message).

Upon receiving the state information notification message, the base station apparatus 2 knows that the mobile station apparatus 1 is currently in the predetermined state or is able to shift to the predetermined state. The base station apparatus 2 then makes an efficient scheduling for the mobile station apparatus 1 considering the contents of the state information notification message it received. More specifically, scheduling is performed such that data can be efficiently transmitted and received in the predetermined state indicated by the state information notification message sent from the mobile station apparatus 1.

For example, if the sent predetermined state includes information about the DRX interval, an appropriate DRX interval based on the predetermined state is set for the mobile station apparatus 1. For example, if the sent predetermined state includes information about the number of resource blocks necessary for one sub-frame, a limited number of resource blocks based on the predetermined state are configured for the mobile station apparatus 1.

Although parameters (only parameters or a parameter and a numerical value) indicating the predetermined state are configured by the base station apparatus 2 for the mobile station apparatus 1 in the above illustrated examples, if one or more predetermined states are configured in advance by the system or if the mobile station apparatus 1 performs determination for all states, parameter configuration by the base station apparatus 2 is not necessary. Such cases are illustrated below.

The base station apparatus 2 then sets information for making the mobile station apparatus 1 start determination of whether the predetermined state is fulfilled or not into an RRC wireless connection reconfiguration message instead of a parameter indicating the predetermined state, and sends it to the mobile station apparatus 1. For example, this information may be set as a measurement configuration. The base station apparatus 2 also deletes information for making the mobile station apparatus 1 start determination on whether the predetermined state is fulfilled or not, thereby notifying the mobile station apparatus 1 to stop determination on whether the predetermined state is fulfilled or not. The mobile station apparatus 1 decides whether its current state fulfills the predetermined state prescribed by the system. Alternatively, the mobile station apparatus 1 autonomously decides whether its current state fulfills the predetermined state in accordance with its own criteria of decision. Determination of whether the mobile station apparatus 1 is in the predetermined state or not on the mobile station apparatus 1 is carried out by the measurement event management unit 110. If the predetermined state is fulfilled, the mobile station apparatus 1 sends a state information notification message to the base station apparatus 2. Information provided in the state information notification message may be the same as any of those used in the state information configuration process (step S105).

For the control messages used in FIG. 3, new messages may be prepared or existing RRC messages of EUTRA may be reused. For example, RRC Connection Reconfiguration message may be reused as RRC wireless connection reconfiguration message, RRC Connection Reconfiguration Complete message as RRC wireless connection reconfiguration complete message, and Measurement report message as state information notification, with addition of necessary parameters.

While, in the first embodiment, the mobile station apparatus 1 sends a state information notification message to the base station apparatus 2 only after predetermined conditions are met, a periodic timer may be implemented and a state information notification message may be sent to the base station apparatus 2 periodically upon expiration of the timer. The periodic timer may be individually set by the base station apparatus 2, uniquely defined in the system, or obtained from broadcast information. Also, a periodic timer may be configured for each predetermined condition or each set of predetermined conditions. That is, the base station apparatus 2 may configure multiple periodic timers for the mobile station apparatus 1.

As described above, in the first embodiment, the mobile station apparatus 1 and the base station apparatus 2 can perform efficient transmission/reception control which achieves low power consumption through determination of whether the current state of the mobile station apparatus 1 fulfills a predetermined state or not.

When instructed by the base station apparatus 2 to monitor its own state, the mobile station apparatus 1 in this embodiment is able to determine whether its state of communication fulfills a predetermined state which has been configured or not based on a combination of parameters defining the predetermined state. The mobile station apparatus 1 can also notify the base station apparatus 2 that the predetermined state is fulfilled based on a combination of parameters representing the predetermined state. The mobile station apparatus 1 can also provide information indicating the fulfilled predetermined state to the base station apparatus 2.

The base station apparatus 2 in this embodiment can configure parameters used for a parameter combination representing the predetermined state for the mobile station apparatus 1 and make the mobile station apparatus 1 start state monitoring and then make it determine whether the communication state of the mobile station apparatus 1 fulfills the predetermined state or not. The base station apparatus 2 receives information indicating that the predetermined state is fulfilled from the mobile station apparatus 1 and accordingly carries out scheduling for the mobile station apparatus 1 so as to enable efficient transmission and reception with low power consumption in the predetermined state indicated by the received information.

Thus, the mobile station apparatus 1 notifies the base station apparatus 2 that the predetermined state which enables efficient utilization of radio resources is fulfilled and the base station apparatus 2 can then make efficient scheduling based on the predetermined state for the mobile station apparatus 1, resulting in reduced power consumption of the mobile station apparatus 1 and base station apparatus 2 and improved efficiency of radio resource utilization.

<Second Embodiment>

The second embodiment of the invention is now described. While the first embodiment disclosed a case where the mobile station apparatus 1 provides the base station apparatus 2 with information indicating that a predetermined state is fulfilled during communication, the second embodiment will disclose a case where the mobile station apparatus 1 provides information indicating that a predetermined state will be possibly fulfilled to the base station apparatus 2 at the start of communication instead of during communication. As the configurations of the mobile station apparatus 1 and base station apparatus 2 employed in this embodiment may be similar to FIGS. 1 and 2, their descriptions are omitted.

Figure 6:
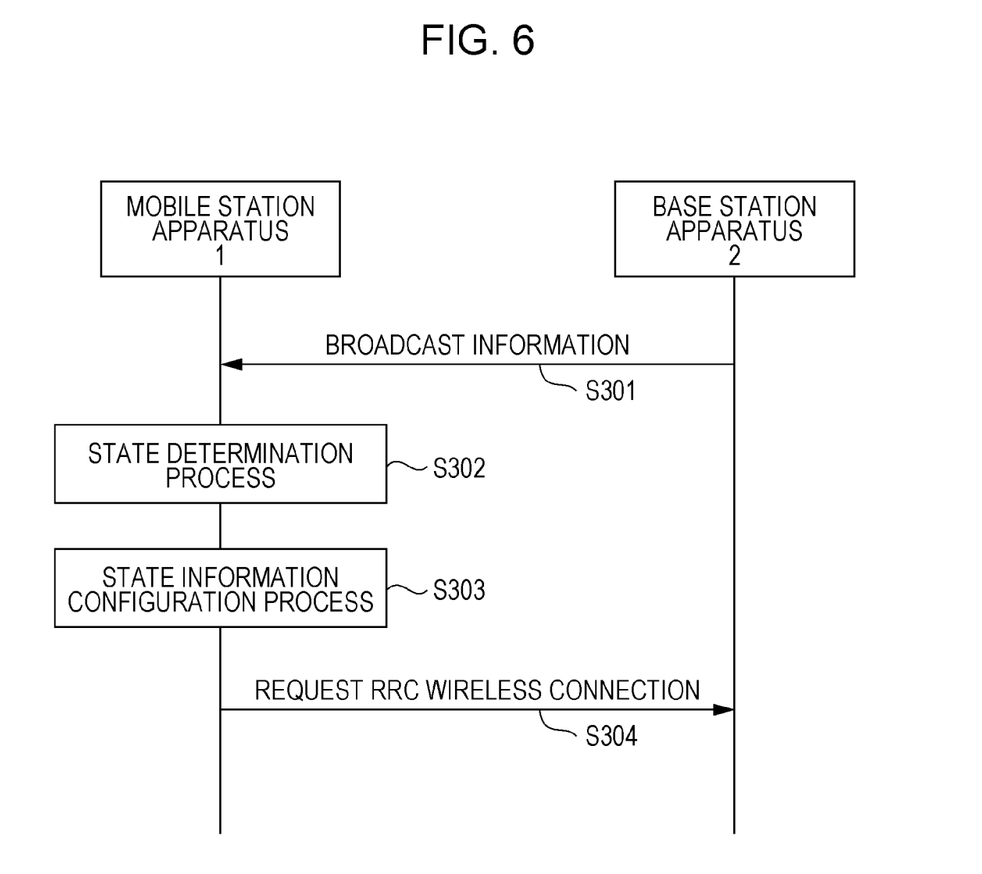
FIG. 6 is a sequence chart diagram showing an example of operations of the mobile station apparatus and the base station apparatus in a second embodiment of the invention.

FIG. 6 is a sequence chart diagram illustrating exchange of information relating to transmission/reception control between the mobile station apparatus 1 and the base station apparatus 2 in the second embodiment. In this sequence chart diagram, the mobile station apparatus 1 starts operation while camping on the base station apparatus 2 (an idle state).

The mobile station apparatus 1 in the idle state obtains broadcast information from the cell of the base station apparatus 2 in which it is camping (step S301). The broadcast information contains information indicating whether or not the mobile station apparatus 1 should notify the base station apparatus 2 of the state of communication to be started when it transitions to an RRC wireless connection established state (connected state). That is, information indicating whether it is necessary or not for the mobile station apparatus 1 to provide notification of its communication state is specified in the broadcast information. Multiple pieces of this information may be specified for different types of mobile station apparatus 1. For example, the information may be separately specified for a normal mobile station apparatus 1 and a mobile station apparatus 1 supporting machine-type communication.

Note that the state of communication in the second embodiment has a different meaning than the first embodiment. The state of communication referred to in the second embodiment is not the state of communication actually conducted between the mobile station apparatus 1 and the base station apparatus 2, but is determined (decided, detected) based on information from higher layers which manage information available in an operating system (OS), the application layer, and the network layer (hereinafter these are collectively called non access stratum (NAS) layer), such as traffic type (application type), expected time before completion of data transmission, and QoS. That is, the state of communication in the second embodiment is information specified by the NAS layer at the start of transmission. This information specified by the NAS layer will be referred to as "NAS layer information" for short below.

For example, as the state of communication, the NAS layer specifies that this communication needs to maintain a connected state preferentially. Alternatively, the NAS layer specifies as the state of communication that this communication does not need to maintain a connected state preferentially. Alternatively, the NAS layer specifies as the state of communication that the traffic of this communication is of the same type as the last connected state. Alternatively, the NAS layer specifies as the state of communication that Long DRX state is permitted in this communication. Alternatively, the NAS layer specifies as the state of communication that this communication permits limited radio resource assignment. Alternatively, the NAS layer specifies a traffic type for this communication as the state of communication. Alternatively, the NAS layer specifies as the state of communication an optimized DRX interval (DRX interval candidate) for the state of communication. Alternatively, the NAS layer indicates an expected duration of this communication as the state of communication. Alternatively, the NAS layer indicates as the state of communication that the expected duration of this communication is the same as the previous communication. Alternatively, the NAS layer indicates whether transmission and reception in this communication is discontinuous or continuous (contiguous) as the state of communication. Alternatively, the NAS layer indicates that intermittent allocation of radio resources is desirable for transmission and reception in this communication as the state of communication. Alternatively, the NAS layer indicates that continuous allocation of radio resources is desirable for transmission and reception in this communication as the state of communication. Alternatively, the NAS layer indicates a guarantee time for which the connected state needs to be maintained in this communication as the state of communication.

At step S301, if the broadcast information from the cell in which it is camping includes information indicating that notification of NAS layer information is supported, the mobile station apparatus 1 provides the information to the NAS layer of the mobile station apparatus 1. At step S302, the mobile station apparatus 1 carries out a state determination process based on the information specified by the NAS layer (NAS layer information). The state determination process is a process to decide whether NAS layer information should be provided to base station apparatus 2 or not. If it decides at step S303 to provide NAS layer information to the base station apparatus 2, the mobile station apparatus 1 sets the NAS layer information to an RRC wireless connection request message and sends it to the base station apparatus 2 (step S304). The NAS layer information may be set as a parameter on the reason for sending the RRC wireless connection request message or as additional information. If the NAS layer information is set as additional information, multiple pieces of NAS layer information may be set in a single message. If the mobile station apparatus 1 decides at step S303 that NAS layer information needs not be provided to the base station apparatus 2, then the process ends. For example, the mobile station apparatus 1 decides that NAS layer information needs not be provided to the base station apparatus 2 when it decides that the cell of the base station apparatus 2 does not support notification of NAS layer information based on information indicated by broadcast information from the base station apparatus 2.

The mobile station apparatus 1 may provide NAS layer information in a response message to the RRC wireless connection configuration message sent from the base station apparatus 2 responsive to the RRC wireless connection request message (namely an RRC wireless connection configuration complete message) instead of an RRC wireless connection request message. The mobile station apparatus 1 may provide NAS layer information to the base station apparatus 2 by reserving a part of the preamble of a random access channel and sending the reserved preamble. The preamble reserved for transmission of NAS layer information may be indicated in broadcast information from the base station apparatus 2.

The mobile station apparatus 1 may provide NAS layer information to the base station apparatus 2 using a Layer 2 message (MAC control element). The mobile station apparatus 1 may be provided with NAS layer information at a time other than the start of communication, that is, while it is in the state of RRC wireless connection being established with the base station apparatus 2. The mobile station apparatus 1 then may use one of a new Layer 3 message, an existing Measurement Report message, or a Layer 2 message (MAC control element) to provide the NAS layer information it has obtained to the base station apparatus 2.

Upon receiving the NAS layer information from the mobile station apparatus 1, the base station apparatus 2 can predict the state of communication about to take place with the mobile station apparatus 1. The base station apparatus 2 then makes an efficient scheduling for the mobile station apparatus 1 considering the contents of the NAS layer information it received. More specifically, it performs scheduling so that data can be efficiently transmitted and received in the state of communication indicated in the NAS layer information provided from the mobile station apparatus 1.

For example, if the provided NAS layer information includes information indicating that priority is given to connected state, the base station apparatus 2 performs scheduling so as to keep the mobile station apparatus 1 in a connected state as long as possible. In contrast, if the provided NAS layer information includes information indicating that priority is not given to connected state, the base station apparatus 2 performs scheduling so as to release the mobile station apparatus 1 preferentially and make it transition to an idle state. If the provided NAS layer information includes information indicating that Long DRX is permitted in the communication, the base station apparatus 2 performs scheduling so as to preferentially place the mobile station apparatus 1 in DRX state. If the provided NAS layer information includes information indicating an optimized DRX interval (DRX interval candidate) for the state of communication, the base station apparatus 2 performs scheduling so as to preferentially set the DRX interval value indicated by the mobile station apparatus 1.

For the control messages used in FIG. 6, new messages may be prepared or existing RRC messages of EUTRA may be reused. For example, System Information message may be reused as broadcast information, RRC Connection Request message as the RRC wireless connection request message, RRC Connection Setup message as the RRC wireless connection configuration message, and RRC Connection Setup Complete message as the RRC wireless connection configuration complete message, with addition of necessary parameters.

As described above, in the second embodiment, since the mobile station apparatus 1 and the base station apparatus 2 can determine the state of communication from NAS layer information, transmission/reception control which is efficient and achieves low power consumption becomes possible.

The mobile station apparatus 1 in this embodiment can decide whether to send information specified by the NAS layer to the base station apparatus 2 or not based on broadcast information. The mobile station apparatus 1 can also notify the base station apparatus 2 of its state of communication based on information specified by the NAS layer.

The base station apparatus 2 in this embodiment can use broadcast information to specify to the mobile station apparatus 1 whether information specified by the NAS layer should be sent to the base station apparatus 2 or not. The base station apparatus 2 can also perform scheduling for the mobile station apparatus 1 so as to enable efficient transmission and reception with low power consumption in the state indicated in the information specified by the NAS layer received from the mobile station apparatus 1.

As noted above, the mobile station apparatus 1 provides information specified by the NAS layer for use in scheduling decision at the base station apparatus 2 and the base station apparatus 2 can make an efficient scheduling based on the information specified for the mobile station apparatus 1 by the NAS layer, resulting in reduced power consumption of the mobile station apparatus 1 and base station apparatus 2 and improved efficiency of radio resource utilization.

It is noted that the above described embodiments are merely illustrative and can be implemented with any of different variations and substitutions. For instance, the present uplink transmission scheme is applicable to a communication system employing either frequency division duplex (FDD) or time division duplex (TDD). For downlink measurements, path loss or other kinds of metrics (SIR, SINR, RSRP, RSRQ, RSSI, BLER) may be used instead, or combination of them may be used. The names of parameters shown in the embodiments are given for the purpose of description: the gist of the invention claimed by the present application is not affected by any difference of the actual parameter names employed from the parameter names used herein.

The mobile station apparatus 1 is not limited to a terminal that moves but embodiments of the present invention may be implemented with the functionality of the mobile station apparatus 1 realized in a fixed terminal, for example. The mobile station apparatus is also called a user terminal, terminal apparatus, communication terminal, mobile machine, user equipment (UE), or mobile station (MS). The base station apparatus is also called a wireless base station apparatus, base station, wireless base station, fixed station, Node-B (NB), evolved Node-B (eNB), base transceiver station (BTS), or base station (BS).

While the mobile station apparatus 1 and base station apparatus 2 in the illustrated embodiments were described with functional block diagrams for the sake of illustration, steps of methods or algorithms for realizing (some of) the functions of the components of the mobile station apparatus 1 and base station apparatus 2 may be directly embodied by hardware, software modules executed by a processor, or a combination thereof. In software implementation, the functions can be maintained or delivered as one or more instructions or codes on a computer-readable medium. Computer-readable media include both communication media and computer recording media including media that facilitate transport of a computer program from one location to another.

One or more instructions or codes may be then recorded on a computer-readable recording medium and the one or more instructions or codes recorded on the recording medium may be read and executed by a computer system to thereby control the mobile station apparatus 1 and the base station apparatus 2. A computer system referred to herein is intended to include an OS and hardware such as peripherals.

The operations recited in the embodiments of the invention may be realized by programs. Programs to run on the mobile station apparatus 1 and the base station apparatus 2 according to the embodiments of the invention are programs that control a CPU or the like (programs that make a computer function) so as to realize the functionality of the embodiment of the invention. Information handled in the apparatuses is temporarily saved in RAM while it is processed, and thereafter stored in various kinds of ROM or an HDD, where it is read, modified, or written by a CPU as necessary. In addition to implementing the functionality of the above illustrated embodiments through execution of programs, the functionality of the embodiments of the invention may be implemented through cooperative processing with an operating system, other application programs, or the like in accordance with instructions of the programs.

The term "computer-readable recording media" refers to storage apparatuses including portable media such as semiconductor media (for example, RAM or nonvolatile memory card), optical recording media (for example, DVD, MO, MD, CD, or BD), magnetic recording media (for example, magnetic tape or flexible disk), a disk unit contained in a computer system, and the like. The term "computer-readable recording media" also includes media that maintains a program dynamically for a short time period, such as transmission lines used when a program is transmitted over a network such as the Internet or a communication line such as a telephone line, as well as media for maintaining the program for a certain amount of time, such as volatile memory in a computer system serving as a server or a client in such a scenario.

The program may implement part of the aforementioned functions, or implement the aforementioned functions in combination with programs already recorded in the computer system.

The functional blocks or features of the mobile station apparatus 1 and base station apparatus 2 used in the illustrated embodiments may be implemented or executed by a general-purpose processor, digital signal processor (DSP), application specific integrated circuit (ASIC), field programmable gate array signal (FPGA), other programmable logical apparatuses, a discrete gate or transistor logic, or discrete hardware components designed to carry out the functionality described herein, or a combination thereof. The general-purpose processor may be a microprocessor or alternatively a conventional processor, a controller, a microcontroller, or a state machine.

The processor may be implemented as a combination of computing apparatuses. For example, a DSP combined with a microprocessor, multiple microprocessors, one or more microprocessors connected with a DSP core, or other like combinations may be used.

The embodiments of the invention may also be configured as follows. An embodiment of the invention is a terminal apparatus that communicates with a base station apparatus. The terminal apparatus receives a parameter for use in determination of the communication state of the terminal apparatus from the base station apparatus, sets state determination conditions based on the parameter, compares the state determination conditions with the current communication state of the terminal apparatus, and sends state information indicating the state determination conditions to the base station apparatus if it determines that the current communication state of the terminal apparatus fulfills the state determination conditions.

In an embodiment of the invention, the communication state of the terminal apparatus is a state relating to uplink channel transmission control or downlink channel reception control of the terminal apparatus.

In the terminal apparatus according to an embodiment of the invention, the parameter for use in determination of the communication state of the terminal apparatus includes one or a combination of information indicating a transmission interval of uplink data, information indicating a number of sub-frames necessary for a single transmission or reception, information indicating a packet size transmitted in one sub-frame, and information indicating a resource block size necessary for one sub-frame.

In the terminal apparatus according to an embodiment of the invention, the state information includes at least the state determination conditions.

In the terminal apparatus according to an embodiment of the invention, the state information is included in an RRC message and sent.

In the terminal apparatus according to an embodiment of the invention, the state information is included in a MAC control message and sent.

The terminal apparatus in an embodiment of the invention sends the state information to the base station apparatus upon expiration of a timer which starts measuring time when the current communication state of the terminal apparatus has fulfilled the state determination conditions.

An embodiment of the invention is a base station apparatus that communicates with a terminal apparatus. The base station apparatus sends a parameter for setting state determination conditions for use in determination of the communication state of the terminal apparatus to the terminal apparatus, and receives state information indicating the state determination conditions from the terminal apparatus, the state information being sent based on a result of comparison between the state determination conditions and the current communication state of the terminal apparatus.

The base station apparatus in an embodiment of the invention performs scheduling for the terminal apparatus based on the state information indicating the state determination conditions.

An embodiment of the invention is a communication system including a base station apparatus and a terminal apparatus. The base station apparatus sends a parameter for use in determination of the communication state of the terminal apparatus to the terminal apparatus. The terminal apparatus receives the parameter from the base station apparatus, sets state determination conditions based on the parameter, compares the state determination conditions with the current communication state of the terminal apparatus, and sends state information indicating the state determination conditions to the base station apparatus if it determines that the current communication state of the terminal apparatus fulfills the state determination conditions.

In the communication system according to an embodiment of the invention, the base station apparatus performs scheduling for the terminal apparatus based on the state information indicating the state determination conditions.

An embodiment of the invention is a transmission and reception control method for a terminal apparatus. The method includes the steps of: receiving a parameter for use in determination of the communication state of the terminal apparatus from the base station apparatus; setting state determination conditions based on the parameter; comparing the state determination conditions with the current communication state of the terminal apparatus; and sending state information indicating the state determination conditions to the base station apparatus if it is determined that the current communication state of the terminal apparatus fulfills the state determination conditions.

An embodiment of the invention is an integrated circuit for installation in a terminal apparatus. The integrated circuit causes the terminal apparatus to carry out the functions including: receiving a parameter for use in determination of the communication state of the terminal apparatus from the base station apparatus; setting state determination conditions based on the parameter; comparing the state determination conditions with the current communication state of the terminal apparatus; and sending state information indicating the state determination conditions to the base station apparatus if it is determined that the current communication state of the terminal apparatus fulfills the state determination conditions.

While the embodiments of the invention have been described in detail with respect to specific examples, it will be apparent that the spirit of the embodiments and the scope of claims of the invention are not limited by the specific examples. The description herein is intended to provide illustration and does not imply any limitation on the embodiments of the invention.

DESCRIPTION OF REFERENCE NUMERALS 1 mobile station apparatus
2 base station apparatus
101, 201 reception unit
102, 202 demodulation unit
103, 203 decoding unit
104 measurement processing unit
105, 204 control unit
106 random access control unit
107, 205 coding unit
108, 206 modulation unit
109, 207 transmission unit
110 measurement event management unit
111, 208 higher layer
209 network signal transmission/reception unit

The invention claimed is:

1. A terminal apparatus configured to communicate with a base station apparatus, the terminal apparatus comprising:
higher layer processing circuitry that:
sends capability information, to the base station apparatus, indicating whether notification of a state relating to power consumption of the terminal apparatus is possible or not, and
receives a parameter, from the base station apparatus, for use in notification of the state relating to the power consumption of the terminal apparatus, and
management circuitry that determines the state relating to power consumption based on current configurations of the terminal apparatus, wherein
the higher lager processing circuitry also sends information, to the base station apparatus, indicating the state relating to power consumption.

2. The terminal apparatus according to claim 1, wherein the configurations of the terminal apparatus are state configurations relating to uplink channel transmission control or downlink channel reception control for the terminal apparatus.

3. The terminal apparatus according to claim 1, wherein the parameter for use in of the state relating to the power consumption of the terminal apparatus comprises one or a combination of information indicating a transmission interval of uplink data, information indicating a number of sub-frames necessary for a single transmission or reception, information indicating a packet size transmitted in one sub-frame, and information indicating a resource block size necessary for one sub-frame.

4. The terminal apparatus according to claim 1, wherein the state information indicates a preferred state to reduce power consumption of the terminal apparatus.

5. The terminal apparatus according to claim 1, wherein the state information is included in an RRC message and sent.

6. The terminal apparatus according to claim 1, wherein if the parameter for use in notification of the state relating to the power consumption of the terminal apparatus is deleted, determination on the state relating to power consumption based on the current configurations of the terminal apparatus is stopped.

7. A base station apparatus configured to communicate with a terminal apparatus, the base station apparatus comprising:
higher layer processing circuitry that:
receives capability information, from the terminal apparatus, indicating whether notification of a state relating to power consumption of the terminal apparatus is possible or not,
sends a parameter, to the terminal apparatus, for use in notification of the state relating to the power consumption of the terminal apparatus, and
receives state information, from the terminal apparatus, indicating the state relating to power consumption set by the terminal apparatus based on current configurations of the terminal apparatus.

8. A control method for a terminal apparatus configured to communicate with a base station apparatus, the control method comprising:
sending capability information, to the base station apparatus, indicating whether notification of a state relating to power consumption of the terminal apparatus is possible or not;
receiving a parameter, from the base station apparatus, for use in notification of the state relating to the power consumption of the terminal apparatus;
determining the state relating to power consumption based on current configurations of the terminal apparatus; and
sending state information, to the base station apparatus, indicating the state relating to power consumption.

9. An integrated circuit for implementation in a terminal apparatus configured to communicate with a base station apparatus, the integrated circuit comprising:
higher layer processing circuitry that
sends capability information, to the base station apparatus, indicating whether notification of a state relating to power consumption of the terminal apparatus is possible or not; and
receives a parameter, from the base station apparatus, for use in notification of the state relating to the power consumption of the terminal apparatus; and
management circuitry that determines the state relating to power consumption based on current configurations of the terminal apparatus; wherein
the higher layer circuitry also sends state information, to the base station apparatus, indicating the state relating to power consumption.

* * * * *